US009326221B2

(12) United States Patent
Väre et al.

(10) Patent No.: US 9,326,221 B2
(45) Date of Patent: Apr. 26, 2016

(54) METHOD AND SYSTEM FOR SIGNALING NEIGHBORING SIGNALS IN TPS BITS

(75) Inventors: Jani Väre, Kaarina (FI); Jarno Kallio, Turku (FI); Tommi Auranen, Turku (FI)

(73) Assignee: Nokia Technologies Oy, Espoo (FI)

( * ) Notice: Subject to any disclaimer, the term of this patent is extended or adjusted under 35 U.S.C. 154(b) by 1531 days.

(21) Appl. No.: 11/339,527

(22) Filed: Jan. 26, 2006

(65) Prior Publication Data

US 2007/0173194 A1    Jul. 26, 2007

(51) Int. Cl.
*H04W 36/00* (2009.01)
*H04B 7/00* (2006.01)
(Continued)

(52) U.S. Cl.
CPC .............. *H04W 48/10* (2013.01); *H04H 20/26* (2013.01)

(58) Field of Classification Search
CPC ..... H04W 84/12; H04W 48/16; H04W 48/20; H04W 60/00; H04W 80/04; H04W 16/18; H04W 84/10; H04W 36/0016; H04W 36/0061; H04W 36/0066; H04W 36/0083; H04W 36/0088; H04W 48/10; H04W 8/26; H04W 28/06; H04W 36/0055; H04W 36/06; H04W 36/30; H04W 36/32; H04W 40/248; H04W 48/17; H04W 52/40; H04W 72/042; H04W 72/0426; H04W 72/0446; H04W 88/06; H04W 48/12; H04W 48/18; H04N 21/235; H04N 21/23617; H04N 21/2362; H04N 21/434; H04N 21/435; H04N 21/6112; H04N 21/6131; H04N 21/6405; H04N 21/6408; H04N 21/64322; H04N 21/84; H04H 20/26; H01Q 9/0435; H04J 3/12; H04J 3/1647
USPC ............ 455/3.04, 342, 401, 433, 434, 435.1, 455/436, 445, 466, 523, 524, 208, 331, 350, 455/406, 450, 503, 525, FOR. 117, 423, 455/452.1; 370/207, 236, 328, 331, 335, 370/338, 349, 373, 377, 384, 385, 410, 426, 370/432, 467, 496, 522, 524, 254, 324, 390, 370/401, 432.1, 466, 480, 507, 509, 511, 370/208, 314, 330, 337, 342, 347, 368, 370/517; 375/295, 261, 279, 332, 341, 343; 725/39, 62, 63, 67, 117, 118, 126
See application file for complete search history.

(56) References Cited

U.S. PATENT DOCUMENTS 5,193,091 A * 3/1993 Crisler et al. ................. 370/336
5,519,706 A * 5/1996 Bantz .................... H04L 9/0844
370/329
(Continued)

FOREIGN PATENT DOCUMENTS

EP    1503608        2/2005
EP    1717974 A2    11/2006
(Continued)

OTHER PUBLICATIONS

Final Draft ETSI EN 300 744 V1.5.1 (Jun. 2004) Digital Video Broadcasting (DVB): Framing structure, channel coding and modulation for digital terrestrial television, pp. 1-64.
(Continued)

*Primary Examiner* — Paul P Tran
(74) *Attorney, Agent, or Firm* — Banner & Witcoff, Ltd.

(57) ABSTRACT

Provided are apparatuses and methods for detecting neighboring cells in a communication network based on Transmission Parameter Signaling (TPS) bits received in a signaling frame. In one example, a signaling frame contains a field of TPS bits that indicate a type of the signaling frame. The type of the signaling frame may indicate the information carried in the signaling frame as information of a current cell or a neighboring cell. The signaling frame may further include information from a neighboring cell in the same network or a different network as the current cell. The signaling frame may further be arranged in a superframe in which the a plurality of frames are transmitted to a receiver in a certain sequence. Each frame in a superframe or a sequence of frames may include a parameter for defining the location of the frame.

16 Claims, 10 Drawing Sheets

(51) Int. Cl.
*H04M 1/00* (2006.01)
*H04L 12/28* (2006.01)
*H04W 4/00* (2009.01)
*G06F 3/00* (2006.01)
*G06F 13/00* (2006.01)
*H04N 5/445* (2011.01)
*H04N 7/173* (2011.01)
*H04W 48/10* (2009.01)
*H04H 20/26* (2008.01)

(56) References Cited

U.S. PATENT DOCUMENTS

| | | | | |
|---|---|---|---|---|
| 5,553,316 | A * | 9/1996 | Diepstraten | H04W 52/24 370/445 |
| 6,188,904 | B1 | 2/2001 | Marsan | |
| 6,320,843 | B1 * | 11/2001 | Rydbeck | H04L 1/0003 370/207 |
| 6,879,832 | B1 * | 4/2005 | Palm et al. | 455/445 |
| 6,957,067 | B1 * | 10/2005 | Iyer et al. | 455/435.1 |
| 7,440,418 | B2 * | 10/2008 | Marinier et al. | 370/254 |
| 7,787,401 | B2 * | 8/2010 | Kinder et al. | 370/310 |
| 8,340,665 | B2 * | 12/2012 | Jeong et al. | 455/432.1 |
| 2002/0080887 | A1 * | 6/2002 | Jeong et al. | 375/295 |
| 2003/0072255 | A1 | 4/2003 | Ma et al. | |
| 2003/0231612 | A1 * | 12/2003 | Kim et al. | 370/342 |
| 2005/0053043 | A1 * | 3/2005 | Rudolf et al. | 370/337 |
| 2005/0232223 | A1 * | 10/2005 | Muller | 370/350 |
| 2005/0250498 | A1 * | 11/2005 | Lim et al. | 455/436 |
| 2006/0058008 | A1 * | 3/2006 | Choksi | 455/406 |
| 2006/0084435 | A1 * | 4/2006 | Borsos et al. | 455/436 |
| 2006/0262751 | A1 * | 11/2006 | Vermola et al. | 370/331 |
| 2007/0014267 | A1 * | 1/2007 | Lam et al. | 370/338 |
| 2007/0133497 | A1 * | 6/2007 | Vare et al. | 370/345 |
| 2007/0173194 | A1 | 7/2007 | Vare et al. | |
| 2007/0173254 | A1 * | 7/2007 | Tebbit et al. | 455/434 |
| 2008/0095088 | A1 * | 4/2008 | Ryu | H04W 60/00 370/311 |

FOREIGN PATENT DOCUMENTS

| | | |
|---|---|---|
| EP | 21816766 | 8/2007 |
| WO | WO 2004086656 A1 * | 10/2004 |
| WO | WO 2004098214 A1 * | 11/2004 |

OTHER PUBLICATIONS

Korean Patent Application No. 10-2008-7019399 Office Action dated Apr. 26, 2010.
Olofsson, et al., "A Concept for Dynamic Neighbor Cell List Planning in a Cellular System", Personal, Indoor and Mobile Radio Communications, 1996. PIMRC '96, Seventh IEEE International Symposium on Taipei, Taiwan Oct. 15-18, 1996, vol. 1, pp. 120-142.
Zhang, et al., "Design and Evaluation of a Handover Decision Strategy for 4th Generation Mobile Networks", VTC 2003-Spring, the 57th IEEE Semiannual Vehicular Technology Conference Proceedings, Jeju, Korea, Apr. 22-25, 2003, vol. 3, pp. 1969-1973.
Supplementary European Search Report for EP06821031 dated Feb. 22, 2012.
Notification of the Third Office Action in CN200680051602.4 dated Dec. 23, 2011, with English translation.

* cited by examiner

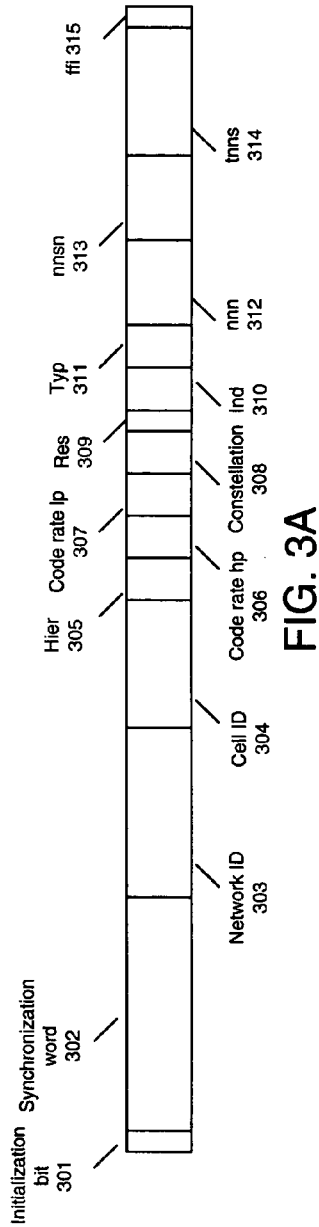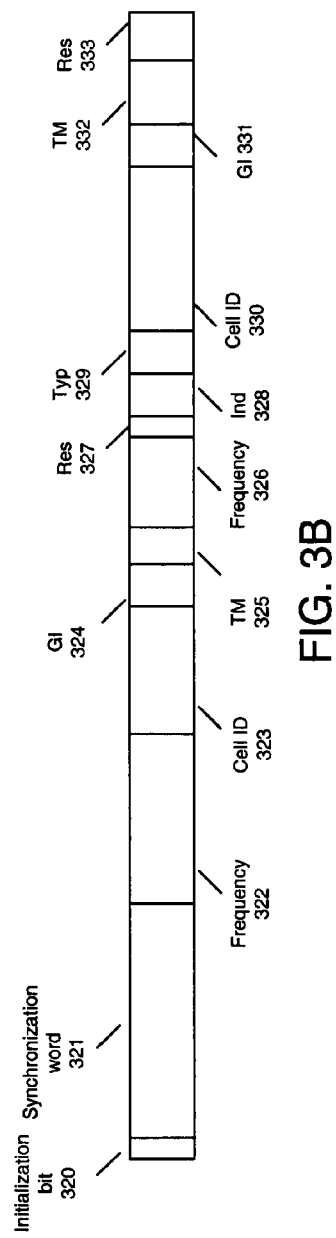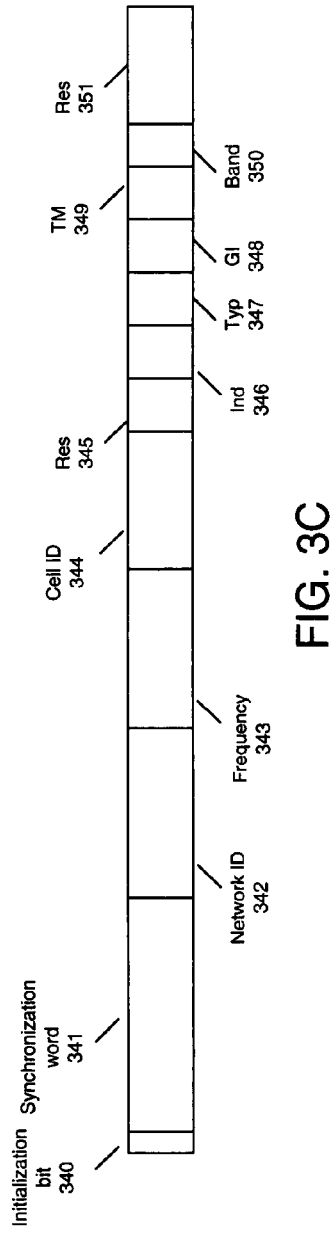

METHOD AND SYSTEM FOR SIGNALING NEIGHBORING SIGNALS IN TPS BITS

FIELD OF THE INVENTION

The invention relates generally to communications networks. More specifically, the invention relates to parameter signaling in a communication network.

BACKGROUND OF THE INVENTION

Digital broadband broadcast networks enable end users to receive digital content including video, audio, data, and so forth. Using a mobile terminal, a user may receive digital content over a wireless digital broadcast network. Digital content can be transmitted in a cell within a network. A cell may represent a geographical area that may be covered by a transmitter in a communication network. A network may have multiple cells and cells may be adjacent to other cells.

Typically, access from one cell to signals being transmitted in a neighboring cell has been problematic. When information of signals in a neighboring cell is desired, such access may be difficult to obtain without a large expenditure of time and power. For example, access to signals in a neighboring cell via an interaction network wastes time as well as power of the receiver.

Therefore, there exists a need for a method and system for detecting from one cell information in another cell in a rapid and efficient manner. Also, there exists a need in the art for a method and system for detecting such information such that excessive power in a receiver is not needlessly wasted.

BRIEF SUMMARY OF THE INVENTION

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the more detailed description below.

In one example, a method is provided for receiving information and for detecting a neighboring cell in a communication network. For example, Transmission Parameter Signaling (TPS) bits may be received in a signaling frame for indicating a type of signaling frame. Based on the type of the signaling frame, the information in the signaling frame may be determined to be parameters for the neighboring cells.

In another example, the signaling frame may be arranged in a sequence of signaling frames or superframes. There may also be multiple superframes. In this example, the first signaling frame in each superframe may be designated a first signaling frame within a respective superframe. In another example, the first signaling frame in the first sequence may contain a parameter for indicating the first signaling frame in the first sequence to be the first signaling frame in the first superframe.

In another example, a receiver is provided for receiving TPS bit information in a signaling frame and for determining parameters and signaling of a neighboring cell in the same network or in a different network from the current cell.

In another example, a computer-readable medium is provided containing instructions for performing the steps of determining a type of a received signaling frame and determining parameters corresponding to a neighboring cell based on the type of the signaling frame.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 3A illustrates an example of signaling frames containing TPS bits for indicating parameters of a current signal in accordance with an aspect of the present invention.

FIG. 3B illustrates an example of signaling frames containing TPS bits for indicating parameters of for a neighboring signal in accordance with an aspect of the present invention.

FIG. 3C illustrates an example of a signaling frame indicating parameters for a neighboring signal of a different network as a signal in a preceding frame in accordance with an aspect of the present invention.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

Figure 1:
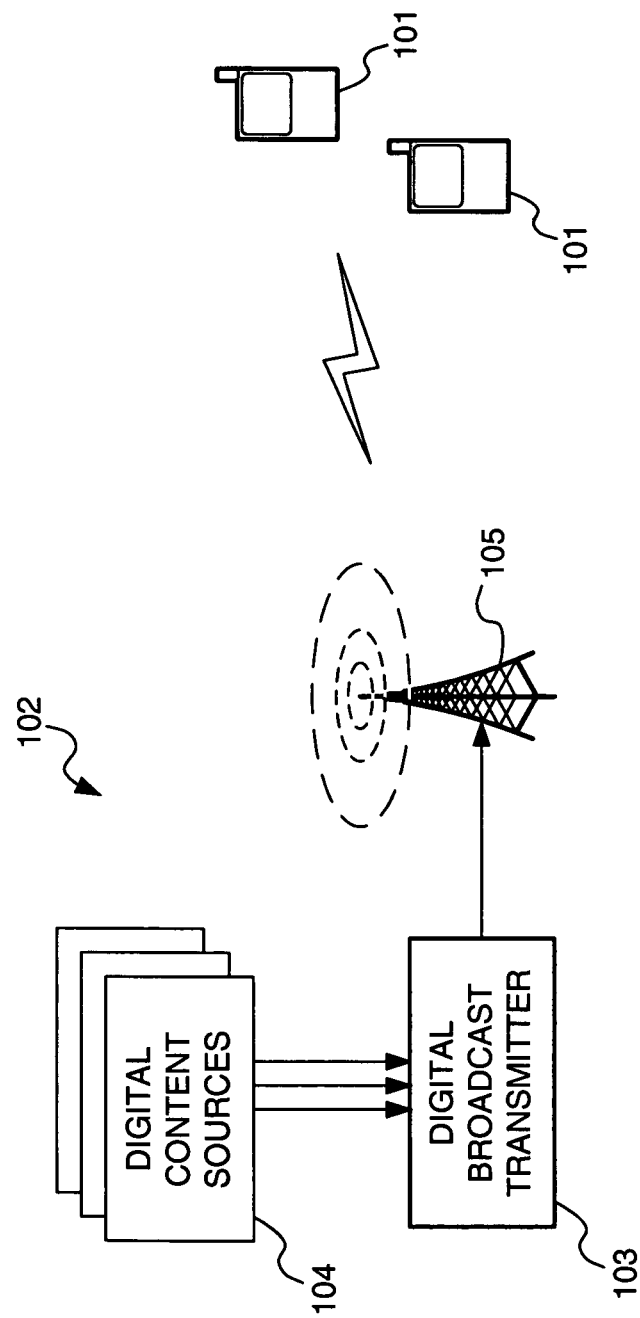
FIG. 1 illustrates a suitable digital broadband broadcast system 102 in which one or more illustrative embodiments of the invention may be implemented.

FIG. 1 illustrates a suitable digital broadband broadcast system 102 in which one or more illustrative embodiments of the invention may be implemented. Systems such as the one illustrated here may utilize a digital broadband broadcast technology, for example Digital Video Broadcast-Handheld (DVB-H). Examples of other digital broadcast standards which digital broadband broadcast system 102 may utilize include Digital Video Broadcast-Terrestrial (DVB-T), Integrated Services Digital Broadcasting-Terrestrial (ISDB-T), Advanced Television Systems Committee (ATSC) Data Broadcast Standard, Digital Multimedia Broadcast-Terrestrial (DMB-T), Terrestrial Digital Multimedia Broadcasting (T-DMB), Forward Link Only (FLO), Digital Audio Broadcasting (DAB), and Digital Radio Mondiale (DRM). Other digital broadcasting standards and techniques, now known or later developed, may also be used. An aspect of the invention is also applicable to other multicarrier digital broadcast systems such as, for example, T-DAB, T/S-DMB, ISDB-T, and ATSC, proprietary systems such as Qualcomm MediaFLO/FLO, and non-traditional systems such 3GPP MBMS (Multimedia Broadcast/Multicast Services) and 3GPP2 BCMCS (Broadcast/Multicast Service).

Digital content may be created and/or provided by digital content sources 104 and may include video signals, audio signals, data, and so forth. Digital content sources 104 may provide content to digital broadcast transmitter 103 in the form of digital packets, e.g., Internet Protocol (IP) packets. A group of related IP packets sharing a certain unique IP address or other source identifier is sometimes described as an IP stream. Digital broadcast transmitter 103 may receive, process, and forward for transmission multiple IP streams from multiple digital content sources 104. The processed digital content may then be passed to digital broadcast tower 105 (or other physical transmission component) for wireless transmission. Ultimately, mobile terminals 101 may selectively receive and consume digital content originating from digital content sources 104.

In an example of the DVB standard, one DVB 10 Mbit/s transmission may have 200, 50 kbit/s audio program channels or 50, 200 kbit/s video (TV) program channels. A mobile device may be configured to receive, decode, and process transmissions based on the Digital Video Broadcast-Handheld (DVB-H) standard or other DVB standards, such as DVB-MHP, DVB-Satellite (DVB-S), DVB-Terrestrial (DVB-T) or DVB-Cable (DVB-C). Similarly, other digital transmission formats may alternatively be used to deliver content and information of availability of supplemental services, such as ATSC (Advanced Television Systems Committee), NTSC (National Television System Committee), ISDB-T (Integrated Services Digital Broadcasting-Terrestrial), DAB (Digital Audio Broadcasting), DMB (Digital Multimedia Broadcasting) or DIRECTV. Additionally, the digital transmission may be time sliced, such as in DVB-H technology. Time-slicing may reduce the average power consumption of a mobile terminal and may enable smooth and seamless handover. Time-slicing consists of sending data in bursts using a higher instantaneous bit rate as compared to the bit rate required if the data were transmitted using a traditional streaming mechanism. In this case, the mobile device may have one or more buffer memories for storing the decoded time sliced transmission before presentation.

Figure 2:
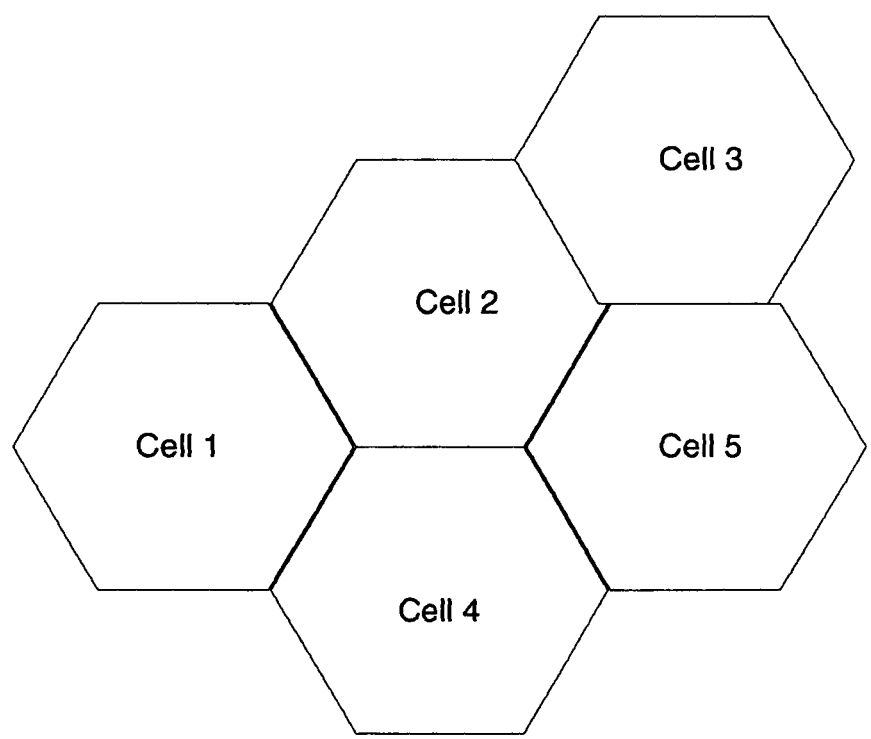
FIG. 2 illustrates an example of cells, each of which may be covered by a different transmitter in accordance with an aspect of the present invention.

In a typical communication system, a cell may define a geographical area that may be covered by a transmitter. The cell may be of any size and may have neighboring cells. FIG. 2 illustrates an example of cells, each of which may be covered by a different transmitter. In this example, Cell 1 represents a geographical area that is covered by a transmitter for a communication network. Cell 2 is next to Cell 1 and represents a second geographical area that may be covered by a different transmitter. Cell 2 may, for example, be a different cell within the same network as Cell 1. Alternatively, Cell 2 may be in a network different from that of Cell 1. Cells 1, 3, 4, and 5 are neighboring cells of Cell 2, in this example.

In one example of the present invention, data transmission within one cell may be detected from a different cell. For example, if a receiver is within Cell 2 of FIG. 2, the receiver may also receive information regarding signals in Cells 1, 3, 4, and/or 5 in a rapid and efficient manner.

In one example, information pertaining to data transmission from a different cell or a neighboring cell may be provided in Transmission Parameter Signaling (TPS) bits within signaling frames. For example, Orthogonal Frequency Divisional Multiplexing (OFDM) frames containing TPS bits may be provided for providing information or parameters of a current signal or parameters for neighboring cells. The type of frame, parameters and information provided in the frame, and/or the order of the frames may indicate the type of contents or the bits within the frame.

Each frame may contain any number (e.g. 68 bits) of TPS bits. The TPS bits of each frame may indicate the status of the frame. For example, a frame may contain a DVB-H indicator field that may indicate the type of frame with regard to the data carried in the frame. As one example, the type indicator field may indicate a frame of the current cell or a neighboring cell. Also, the type indicator field of the signaling frame may indicate if the cell is of the same network or different network from the current cell. Also, a frame may contain an optional synchronization word. In one example, a frame may contain a synchronization word of 16 bits. In addition, the frame may contain an optional initialization bit.

The fields within a frame may be of varying lengths and may provide any type of information pertinent to the signaling frame or data communication. Also, the fields may be in any order or at any location within the frame. Also, multibit fields may be divided into multiple parts within the frame such that a part of the field may be located at one portion of the frame whereas another part of the field may be located at a different portion of the frame. Each of the parts of the field may be separated by any number of other fields of any length.

The fields in a frame may provide any desired information. For example, a frame may contain a field for providing a network identification of the current network. The frame may also contain any other relevant information such as, but not limited to current cell identification, hierarchy, code rate, constellation parameter information, etc. Any of these fields may be of any length and may be arranged in any order. Also, as discussed above, any multibit field may be divided into parts with each part being located at any portion of the frame in any order.

In one example of the present invention, a signaling frame may contain information on neighboring networks. This information may include, for example, a number of neighboring networks within the current cell's coverage area or the number of neighboring signals in the current network and total number of neighboring signals. In another example, a frame may contain a parameter for providing signals of neighboring cells within the same network as the current cell. For example, the parameters may include information on transmission frequency, cell identification, number of parameters related to the signals, guard interval, transmission mode, etc. for each neighboring signal. In another example, a frame may include signaling parameters for neighboring cells that are of different networks as compared to the current cell. As examples of the signaling parameters of this example, the parameters may include network identification, transmission frequency, cell identification, and/or number of parameters related to the signal (e.g., guard interval, transmission mode, and bandwidth).

FIGS. 3A-3C illustrate examples of signaling frames containing TPS bits. FIG. 3A illustrates one example of a signaling frame for indicating parameters of a current signal. In this example, a frame contains various fields for providing parameters of the signal such as an initialization bit 301, a synchronization word 302, a network ID 303, Cell ID 304, Hierarchy information 305, Code rate (306, 307), Constellation 308, and/or Reserved 309. In addition, the frame may contain a type 311 field or a DVB-H indicator field (ind field 310) for providing a type of the frame. As one example, the ind field 310 may contain a value indicating a DVB-H 2.0 signal. Also, the typ field 311 may indicate that the parameters are of the current cell if the typ field 311 contains a first value, that the parameters are of a neighboring cell in the same network if the typ field 311 contains a second value, that the parameters are of a neighboring cell in a different network if the typ field 311 contains a third value or that the parameters are not signaled within this frame if the typ field 311 contains a fourth value. As one example, the type of frame is a current cell if the value of the typ field 311 is "00", a neighboring cell in the same network if the typ field 311 is "01", a neighboring cell in a different network if the typ field 311 is "10".

Also, the frame illustrated in FIG. 3A may further contain an nnn field 312 for providing the number of neighboring networks. This may indicate the number of different neighboring networks and may contain any number of bits. As one example, the nnn field 312 contains 4 bits and may indicate a maximum of 16 different neighboring networks. The frame illustrated in FIG. 3A may also contain an nnsn field 313 for providing the number of neighboring signals in the current network. This field may further indicate the number of neighboring frequencies of the current network. In one example, the nnsn field 313 may contain 4 bits. The frame illustrated in FIG. 3A may further contain a tnns field 314 for providing the total number of neighboring signals and the number of neighboring frequencies part of any network. In one example, the tnns field 314 contains 7 bits and provides a maximum of 128 neighboring signals.

The frame (as illustrated in FIG. 3A) may further contain an ffi field 315 as a first field indicator. This field may indicate if the frame is the first frame in a sequence. For example, if the ffi field 315 is "1", then the frame is the first frame of the sequence or of a superframe (see below). If the ffi field 315 is "0", then the frame is not the first frame of the sequence.

FIG. 3B illustrates another example of a signaling frame in which the signaling frame may indicate parameters for neighboring signals where the neighboring signals in the signaling frame are of the same network as the signals in the preceding frame. In this example, the signaling frame may contain any number of fields for providing any desired signaling information including, but not limited to, frequency 322, cell ID 344, Guard Interval (GI) 348, or transmission mode (TM 349), as illustrated. The signaling frame may further contain a type field 347 or ind field 346 for indicating the type of signaling frame as described above. In this example, the ind field 328 may contain a value indicating a DVB-H 2.0 signal and the type field 329 may contain a value indicating a neighboring signal part of the same network as signals in the preceding frame (e.g., a value of "10").

FIG. 3C illustrates another example of a signaling frame indicating parameters for a neighboring signal part of a different network as the signal in a preceding frame. The frame may include, for example, a frequency field 343, cell ID field 344, TM field 349, bandwidth 350, etc. In addition, the frame may include an ind field 346 that may indicate a DVB-H 2.0 signal. The frame may also include a typ field 347 for indicating the type of frame. In this example, the typ field 347 may contain a value indicating the signals as neighboring signals part of the different network than the signals in the preceding frames (e.g., a value of "01"). In another example, frames subsequent to the signaling frame illustrated in FIG. 3C that are not first frames may announce parameters for the signals with the same network ID 342 signaled within this frame until a new frame type occurs indicating parameters for a network change.

Figure 4A:
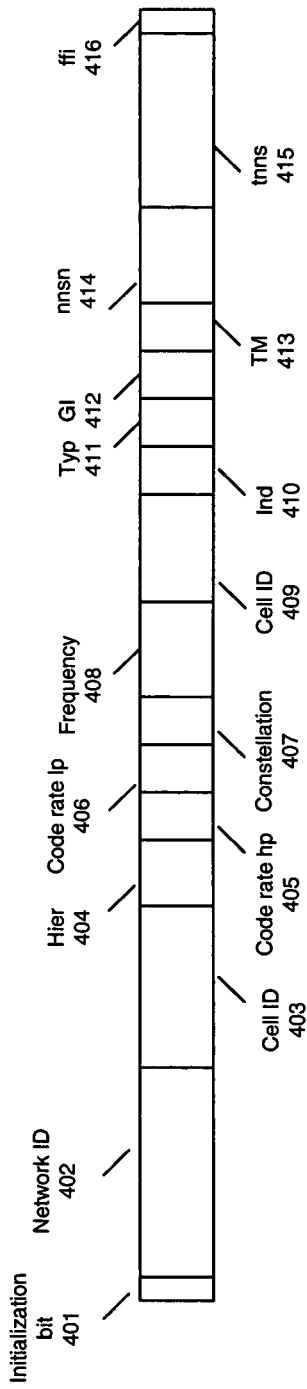
FIG. 4A illustrates an example of a signaling frame of a current signal without a synchronization word in accordance with an aspect of the present invention.
Figure 4B:
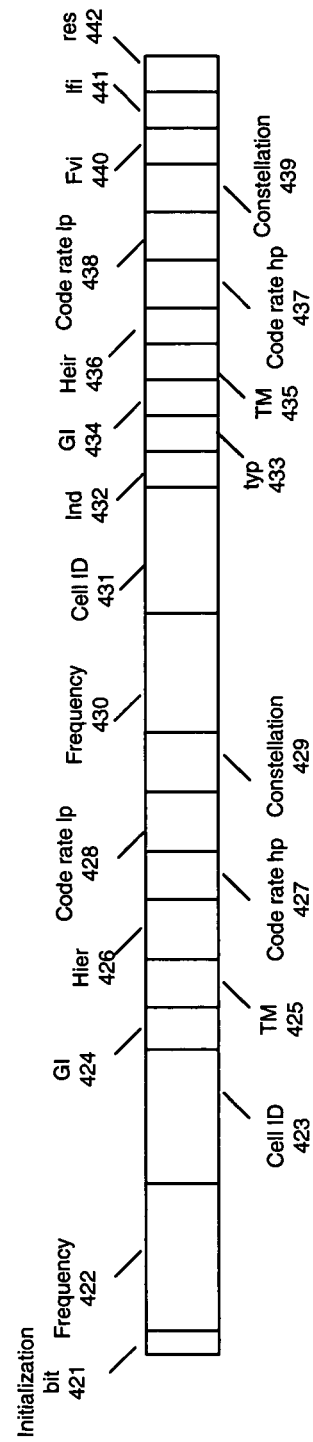
FIG. 4B illustrates an example of a signaling frame for indicating parameters for a neighboring signal without a synchronization word in accordance with an aspect of the present invention.

FIGS. 4A-4B illustrate additional examples of signaling frames without a synchronization word. FIG. 4A illustrates one example of a signaling frame of a current signal. The frame, as illustrated in FIG. 4A may contain any number of fields of any length such as, but not limited to, an initialization field 401, Network ID field 402, Hierarchy field 404, Code rate fields (406, 406), Constellation field 407, Frequency field 408, GI field 412, or Transmission mode field (TM 413). FIG. 4A also illustrates a Cell ID field divided into two portions (403, 409) with each portion present in a different part of the frame.

The frame may further contain an ind field 410 for indicating DVB-H 2.0 signals (e.g., an ind field 410 value of "1"), a type field 411 for indicating the type of frame (e.g., current cell, neighboring cell in the same network, neighboring cell in a different network, or reserved), an nnsn field 414 for indicating the number of neighboring signals in the current network or number of neighboring frequencies part of the current network, a tnns field 415 for indicating the total number of neighboring signals or the number of neighboring frequencies part of any DVB-H 2.0 network, and/or an lfi field 416 as a "last frame indicator" for indicating that the frame contains tuning parameters of the current signal, for example.

FIG. 4B illustrates an example of a signaling frame for indicating parameters for neighboring signals. In this example, The frame indicates parameters for neighboring signals such that a typ field 433 may contain a corresponding value (e.g., a value of "01" or "10") and the frame may contain any number of additional fields including, but not limited to, a frequency field 422, a Cell ID field 423, a GI field 424, and/or TM field 425. In addition, the frame may contain an ind field 432 for indicating a DVB-H 2.0 signal and an lfi field 441 for indicating the last frame (e.g., if the value of lfi 441 is "1", then this frame is the last frame of the transmitted frame cycle). Also, the frame may contain a frame validity indicator (fvi field 440) for indicating if the signals within the frame are valid. For example, if the fvi field 440 contains a value of "0", then only the first signal announced within the frame is valid but if the fvi field 440 contains a value of "1", then both signals announced within the frame are valid.

Figure 5A:
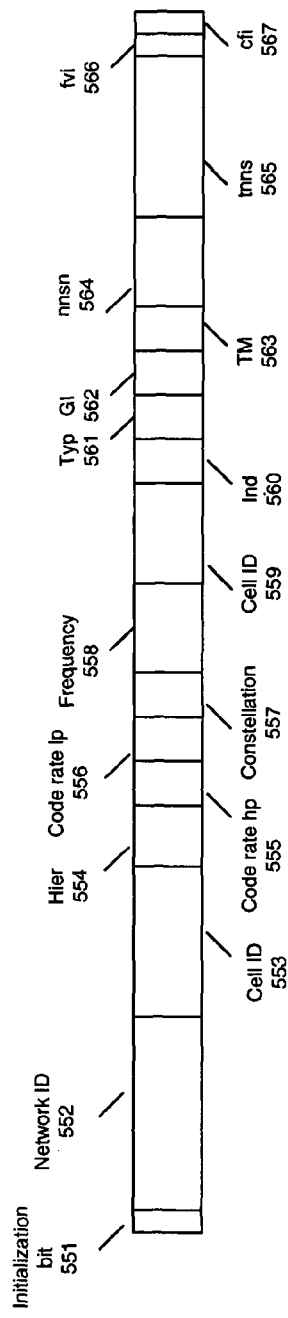
FIG. 5A illustrates an example of a signaling frame of a current signal in accordance with an aspect of the present invention.
Figure 5B:
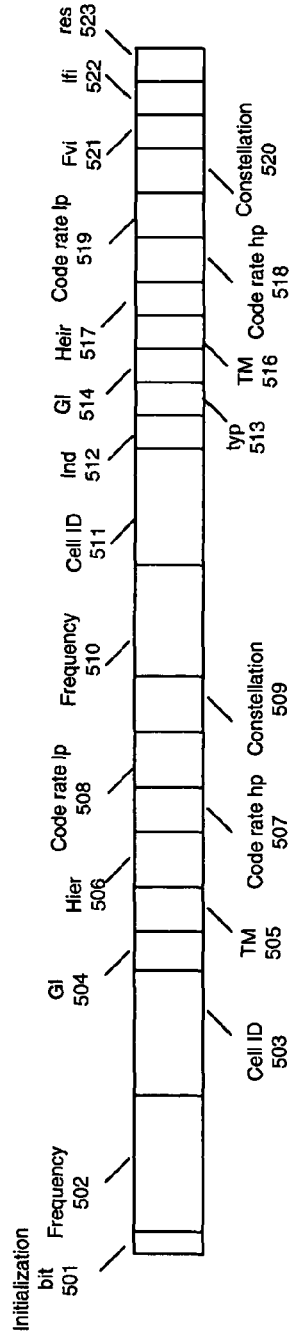
FIG. 5B illustrates an example of a signaling frame for indicating parameters for neighboring signals in accordance with an aspect of the present invention.
Figure 5C:
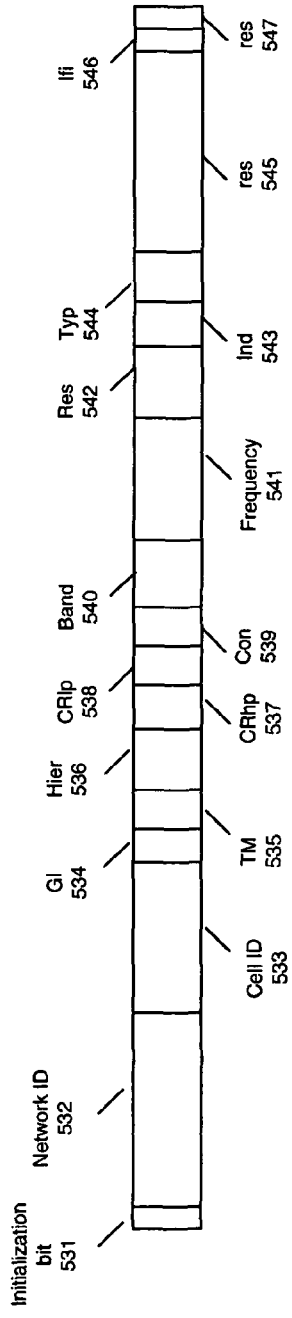
FIG. 5C illustrates an example of a signaling frame for indicating parameters for neighboring signals for network changes in accordance with an aspect of the present invention.

FIGS. 5A-5C illustrate additional examples of signaling frames of the present invention. FIG. 5A illustrates another example of a signaling frame indicating parameters of a current signal. In this example, the signaling frame contains various fields including a typ field 561 for indicating the type of the frame, nnsn field 564 for indicating the number of neighboring signals in the current network, tnns field 565 for indicating the total number of neighboring signals and fvi field 566 for indicating frame validity. In this example, the signaling frame also contains a cfi field 567 for indicating a current frame. For example, if the cfi field 567 contains a value of "1", the frame may contain tuning parameters of the current signal. The current signal may thus be signaled in the beginning of this frame:

FIG. 5B illustrates a signaling frame for indicating parameters for the neighboring signals. In this example, the typ field 513 of the frame may contain a value of "01" for indicating parameters for the neighboring signals in the same network. The frame may further contain various fields including an ind field 512 for indicating DVB-H 2.0 signal and a lfi field 522 for indicating the last frame (e.g., a value of "1" may indicate that this is the last frame of the transmitted frame cycle).

FIG. 5C illustrates another example of a signaling frame for indicating parameters for the neighboring signals when the network changes. In this example, the typ field 544 may contain a value of "10" for indicating the parameters are for the neighboring signals in a different network.

In another example, frames may be arranged in sequences. A first frame in a sequence may contain a field that indicates that the first frame starts the frame sequence. The frame sequence may contain any number of frames and any type of frame. Also, the frame sequence may contain frames of different types in any designated order. Any frame type may be repeated any number of times.

Figure 6:
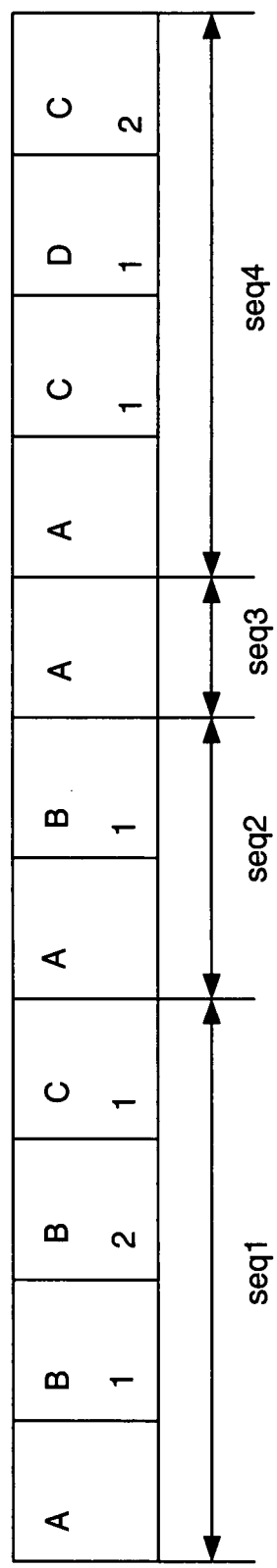
FIG. 6 illustrates an example of frame sequences in accordance with an aspect of the present invention.

FIG. 6 illustrates an example of frame sequences. In this example, four types of frames are illustrated in four different sequences. The different frame types may be any of the frame types of the present invention. For purposes of illustration, four frame types are depicted and arbitrarily designated A, B, and C respectively. In this example, the first sequence contains four frames (A, B, B, C), the second sequence contains two frames (A, B), the third sequence contains one frame (A), and the fourth sequence contains four frames (A, C, C, C). The first frame in each sequence may contain a field indicating the first frame in each corresponding sequence. Also, each of the frames may contain a field indicating the order of the frames within a frame sequence. For example, in the first sequence, the first B frame may contain a field indicating that it is the first B frame in the sequence. The second B frame may contain a field indicating that it is the second B frame in the sequence. The final frame in the first sequence (C frame) may contain a field indicating that it is the first C frame in the sequence.

Frames may further be arranged within superframes in which a frame sequence may contain more than one superframe, the superframes containing more than one frame. For example, a frame sequence may contain two superframes that each contain four frames. In this example, each of the superframes within the frame sequence may begin with the same type of frame. However, the first frame in the first superframe may contain an indicator that indicates the first frame to be in the first superframe and the first frame in the second superframe may contain an indicator that indicates the second superframe. Therefore, in this example, the first frames in both the first superframe and the second superframe both contain a first frame indicator field for indicating if the respective frames are the first frame in the sequence. However, the first field indicator in the first frame of the first superframe contains a value (e.g., "1") for indicating that the superframe containing the frame is the first superframe. The first field indicator in the first frame of the second superframe may contain a value (e.g., "0") for indicating that the superframe containing the frame is the second superframe.

Figure 7:
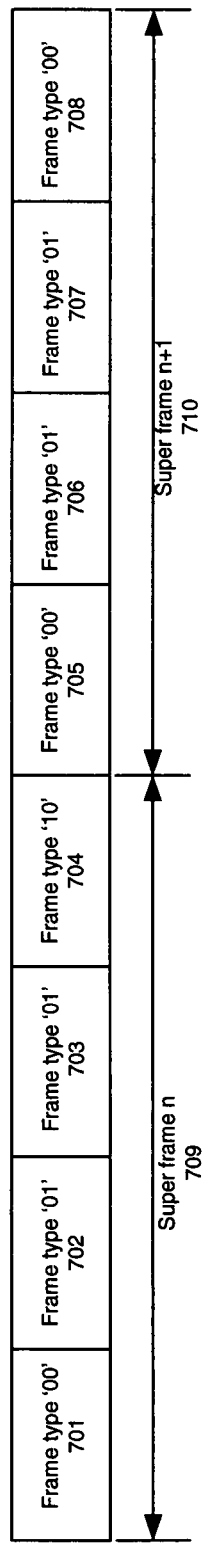
FIG. 7 illustrates another example of signaling of neighboring signals in accordance with an aspect of the present invention.

FIG. 7 illustrates another example of signaling of neighboring signals. In this example eight neighboring signals are arranged in super frames of a current network and a neighboring network. Super frame n (709) contains four signals or frames of different types. In this example, super frame n (709) contains a first frame of frame type "00" (701), a second frame of frame type "01" (702), a third frame of frame type "01" (703) and a fourth frame of frame type "10" (704). Super frame n+1 (710) of this example also contains four frames of type "00" (705), type "01" (706), type "01" (707) and type "00" (708), respectively.

As FIG. 7 illustrates, frame 701 (the first frame of the super frame n 709) carries information of the current signal such that the frame 701 carries the first frequency of the first network. Frame 701 may further contain a first frame indicator field with a value to indicate that frame 701 is the first frame of the first superframe. As one example, the first frame indicator of frame 701 may have a value of "1". Frame 702 (the second frame of super frame n 709) may contain information of neighboring signals that are a part of the same network as frame 701 (the preceding frame). Thus, in this example, frame 702 contains information of the first network. The frame type of frame 702 is "01" which indicates, in this example, that the frame indicates parameters for neighboring signals of the same network. Frame 702 may carry half of the signals of the first network because, in this example, a frame of type "01" may signal a maximum of two signals. The remaining two signals (of four signals) may be signaled by frame 703 which carries information of the remaining signal part of the first network. Also, in frame 703, the second frequency field may be set to a value to indicate that no more signal parts of the first network are signaled (e.g., the second frequency field may be set to "0"). Frame 704 is of frame type "10" in this example, which may indicate that frame 704 contains data for a neighboring cell of a different network. Hence, in this example, frame 704 carries information of the first signal part of the second network.

Super frame n+1 710 of this example contains four frames 705, 706, 707, 708. Frame 705 is of type "00" which indicates that frame 705 carries information of the current signal such that frame 705 carries the first frequency of the first network. Frame 705 is the first frame of the second superframe but is not the first frame of the first superframe. Therefore, the first frame indicator of frame 705 may be set to a value to indicate that frame 705 is not the first frame of the first superframe (e.g., may be set to a value of "0").

Frame 706 is of frame type "01" in this example, which indicates that frame 706 carries information of the neighboring signals of the network that was last added—i.e., the second network. Therefore, frame 706 carries information of neighboring signals of the second network. Frames of frame type "01", in this example, carry a maximum of 2 signals. Therefore, the remaining 2 signals (of 4 signals) may be signaled by frame 707 which carries information of the remaining signal part of the second network. Also, in frame 707, the second frequency field may be set to a value to indicate that no more signal parts of the second network are signaled (e.g., the second frequency field may be set to "0"). Frame 708 is of frame type "00" in this example, which may indicate that frame 708 carries information of the current signal or the first frequency of the first network. Frame 708 is not the first frame of the first superframe. Therefore, the first frame indicator of frame 708 may have a value to indicate that frame 708 is not the first frame of the first superframe (e.g., a value of "0").

Figure 8:
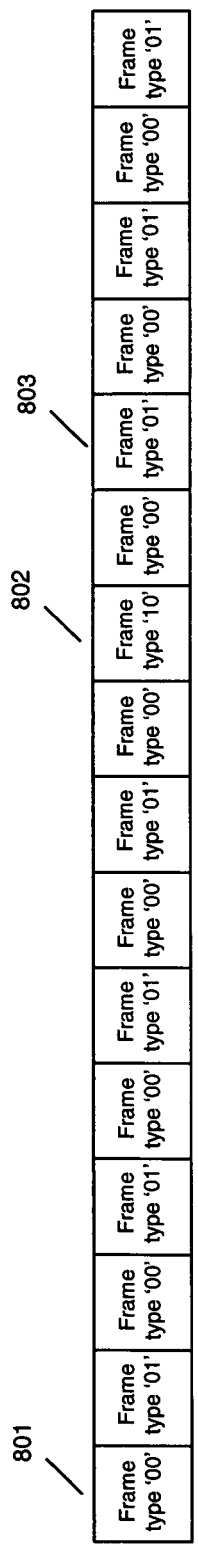
FIG. 8 illustrates another example of combinations of frame types in a frame cycle in accordance with an aspect of the present invention.

FIG. 8 illustrates another example of combinations of frame types in a frame cycle. In this example, a first frame 801 is of frame type "00" which indicates that frame 801 carries information of the current signals of a first network. Also, frame 801 is the first frame of all frames and may therefore have a ffi (first frame indicator) value set to "1".

In this example, every other frame is of frame type "00". Thus, in this example, fast access for parameters of the current cell may be obtained. As FIG. 8 illustrates, there are eight neighboring signals and current signals. Frame 802 is of frame type "10" which indicates that frame 802 carries information of a neighboring cell in a different network. Hence, a new network is signaled by frame 802 and all frames subsequent to frame 802 (except frames of frame type "00") are part of the new network (the network signaled within frame 802). Frame 803 is subsequent to frame 802 and is not of frame type "00". Frame 803 is of frame type "01". Hence, signals announced within frame 803 are part of the network signaled in frame 802 (i.e., the new network).

Figure 9:
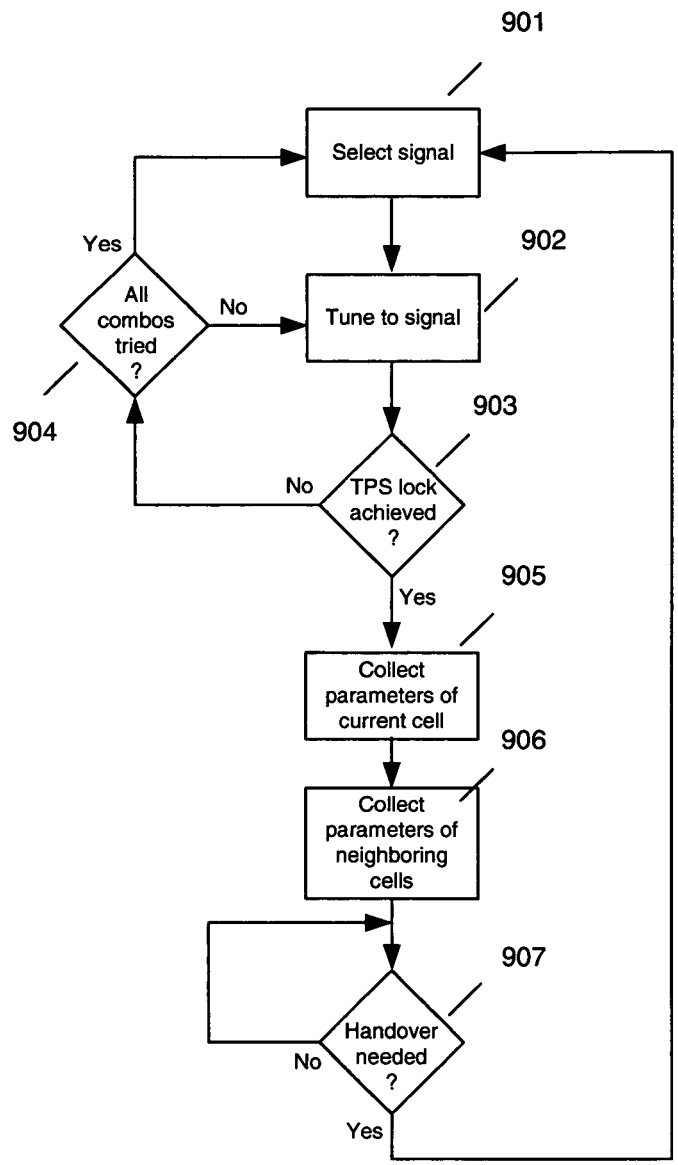
FIG. 9 is a flowchart illustrating an example of a method of obtaining parameters of neighboring cells from TPS bits in accordance with an aspect of the present invention.

FIG. 9 is a flowchart illustrating an example of a method of obtaining parameters of neighboring cells at a mobile receiver from TPS bits according to one aspect of the present invention. In this example, a signal is selected (STEP 901). If no signal is received in STEP 901, then signals are attempted from a predetermined frequency range. For example, signals may be detected in a frequency range between 474 MHz to 698 MHz.

A signal is detected and selected in STEP 901 and tuning to the signal is accomplished in STEP 902. When TPS lock is achieved, such that the receiver can decode the TPS bits, ("YES" branch of STEP 903), then parameters of the current or neighboring cells may be collected. Otherwise ("NO" branch of STEP 903), other combinations of signals are tried (STEP 904) until all combinations are attempted ("YES" branch of STEP 904).

In STEP 905, parameters of the current cell are collected. The frame containing parameters of the current cell may be identified by the type field as described above. For example, if the type field of a frame is "00", then the frame may carry information of the current cell. Hence, in this example, the parameters of the current cell are collected from TPS bits. These parameters may further be stored in memory.

In STEP 906, parameters are collected from neighboring cells. The frame containing parameters of neighboring cells may also be identified through the type field as described above. The parameters of the neighboring cells may thus be collected from TPS bits. Also, the collected parameters may be stored in memory. If handover is needed ("YES" branch of STEP 907), then a new signal may be selected and the process may be repeated with the new signal.

Figure 10:
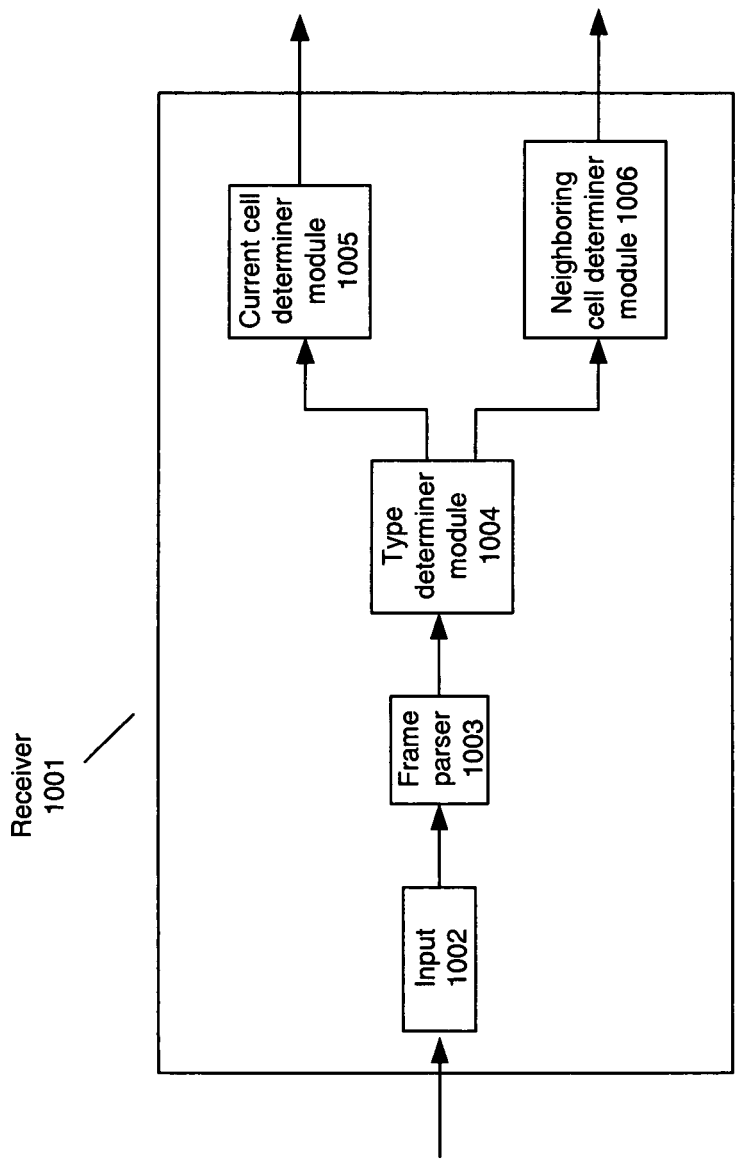
FIG. 10 illustrates a flow chart of an example of receiving ESG fragment information and metadata at a subscriber terminal in accordance with an aspect of the present invention.

FIG. 10 is a partial block diagram of an example of a receiver of the present invention. The receiver 1001 may include an input 1002 for receiving a signaling frame. The signaling frame may be included in a sequence of signaling frames or a superframe. The signaling frame received at the input 1002 may include TPS bits which may include information on the current cell or a neighboring cell in a communication network. As the example of FIG. 10 illustrates, the receiver 1001 may further include a frame parser 1003 for receiving a signaling frame received at the input 1002. The frame parser 1003 may identify the TPS bits in the signaling frame received at the input 1002. The TPS bits may include, for example, a type indicator for indicating the type of the signaling frame. In one example, the type of frame is determined to be a current cell based on a value of the corresponding type TPS bit. In another example, the type of frame is determined to be a neighboring cell. In addition, if the type of frame is determined to be a neighboring cell, the type of frame may further determined the neighboring cell to be of the same network as the current cell or of a different network as the current cell.

The example of the receiver illustrated in FIG. 10 further includes a type determiner module 1004 for determining the type of signaling frame received at the input 1002. The type determiner module 1004 receives the TPS bits from the frame parser 1003 including a type indicator TPS bit. Based on the value of the type indicator TPS bit, the type determiner module 1004 may determine the type of the signaling frame received at the input 1002 of the receiver 1001. For example, if the type of the frame is determined by the type determiner module 1004 to be "00", then the signaling frame received at the input 1002 of the receiver 1001 carries information of the current cell. If the type of the frame received at the input 1002 of the receiver 101 is determined by the type determiner module 1004 to be "01", then the received signaling frame carries information of a neighboring cell from the same network. If the type of the frame received at the input 1002 of the receiver 1001 is determined by the type determiner module 1004 to be "10", then the received signaling frame carries information of a neighboring cell from a different network. These values are merely examples and the present invention is not limited to any specific value. Also, the received information is possibly stored on receiver's memory and it may be used on future handover decisions.

The type determiner module 1004 may thus determine the type of the frame and may also determine the information carried in the received signaling frame as described. If the information carried in the received signaling frame is determined to be current cell information, then the receiver may process the received signaling frame in the current cell determiner module 1005 as current cell information.

In addition, the receiver 1001 may further include a neighboring cell determiner module 1006 that may further characterize the neighboring signals. For example, the neighboring cell determiner module 1006 may further determine the number of neighboring networks or the number of different neighboring networks. As one example, the neighboring cell determiner module 1006 may detect TPS bits in the received signaling frame to determine the number of neighboring networks. The signaling frame may include an nnn field that contains a value indicating the number of neighboring networks. Likewise, the signaling frame may also include a tnns field for indicating the total number of neighboring signals. The neighboring cell determiner module 1006 may thus detect the number of neighboring networks and/or number of neighboring signals/frequencies based on parameters received in the signaling frame.

In another aspect of the present invention, frequencies of neighboring signals may be signaled. In one example, the frequencies of neighboring signals may be signaled using real channel numbers or virtual channel numbers. Mapping between real and virtual channel numbers may be accomplished by storing the mappings in a table. The table may be stored at a terminal. Table I is an example of mapping between real or virtual channel numbers to frequencies of neighboring signals.

TABLE I

| Frequency/Channel Mapping | | |
| --- | --- | --- |
| Frequency (MHz) | Channel number | Value signaled in TPS bits |
| N/A | 0 | 00000000 |
| 474 | 1 | 00000001 |
| 479 | 2 | 00000010 |
| 480 | 3 | 00000011 |
| 481 | 4 | 00000100 |
| 482 | 5 | 00000101 |
| 484 | 6 | 00000110 |
| 486 | 7 | 00000111 |
| 488 | 8 | 00001000 |
| 489 | 9 | 00001001 |

TABLE I-continued

Frequency/Channel Mapping

| Frequency (MHz) | Channel number | Value signaled in TPS bits |
|---|---|---|
| 490 | 10 | 00001010 |
| ... | ... | ... |
| 698 | 225 | 11100001 |

In another example of frequency/channel mapping, mapping between real and virtual channel numbers may include additional information such as the standard used, the bandwidth or frequency range. Table 2 illustrates another example of frequency/channel mapping.

TABLE 2

| Standard | Bandwidth | Frequency range (MHz) | Channel number | Value signaled in TPS bits |
|---|---|---|---|---|
| N/A | N/A | N/A | 0 | 0000000 |
| DVB-H (Europe) | 8 MHz | 474-698 | 1-28 | 0000001-0011100 |
| DVB-H (Australia) | 7 MHz | 529.5-676.5 | 29-50 | 0011101-0110010 |
| DVB-H (Taiwan) | 6 MHz | 473-683 | 51-85 | 0110011-01010101 |
| DVB-H (USA) | 5 MHz | 1672.5 | 86 | 1010110 |
| — | — | Reserved | 86-127 | 1010111-1111111 |

Hence, in the present invention, a receiver may detect neighboring cells on the basis of TPS bits and signaling by means of the TPS bits. The TPS bits of a frame may include information on frame types that may be used for signaling parameters for a current signal, neighboring signals of the same network, neighboring signals of a different network, or an empty frame. Frames may further be arranged into superframes which may include more than one frame.

In another example, a computer-readable medium is provided containing computer-readable instructions for determining parameters in a signaling frame in a neighboring cell as described. For example, the computer-readable medium may contain instructions for determining the parameters in a frame of a neighboring cell based on the type of the signaling frame. The type of the signaling frame may be indicated, for example, in a parameter in the signaling frame.

The embodiments herein include any feature or combination of features disclosed herein either explicitly or any generalization thereof. While the invention has been described with respect to specific examples including presently preferred modes of carrying out the invention, those skilled in the art will appreciate that there are numerous variations and permutations of the above described systems and techniques.

We claim:

1. A method comprising:
   receiving, from a transmitter in a first cell of a first digital broadcast network on a first frequency, a digital broadcast signal comprising digital multimedia content and a signaling frame, the signaling frame comprising transmission parameter signaling bits that provide parameters of the first cell and provide parameters of a second cell of a second digital broadcast network;
   detecting, by a device, the second cell based on at least one of the transmission parameter signaling bits in the received signaling frame; and
   obtaining the parameters of the second cell contained within the transmission parameter signaling bits,
   wherein the transmission parameter signaling bits comprise a network identifier for the second digital broadcast network, a cell identifier for the second cell, a transmission frequency for the second digital broadcast network, a guard interval for the second digital broadcast network, and a transmission mode for the second digital broadcast network.

2. The method of claim 1, wherein the receiving step comprises:
   receiving a first superframe comprising at least the signaling frame, wherein the signaling frame comprises a first frame indicator parameter indicating the signaling frame as a first frame in the first superframe; and
   receiving a second superframe, the second superframe comprising at least one other signaling frame including information of the second cell.

3. The method of claim 1 wherein the signaling frame includes information indicating a number of neighboring networks, a number of neighboring signals in a current network, and a total number of neighboring frequencies.

4. The method of claim 1, wherein the transmission parameter signaling bits for the first cell and the second cell include Digital Video Broadcast-Handheld signaling.

5. An apparatus comprising:
   an input configured to receive, from a transmitter in a first cell of a first digital broadcast network on a first frequency, a digital broadcast signal comprising digital multimedia content and a signaling frame, the signaling frame comprising transmission parameter signaling bits that provide parameters of the first cell of the first digital broadcast network and provide parameters of a second cell of a second digital broadcast network; and
   a cell determiner configured to obtain the parameters of the second cell contained within the transmission parameter signaling bits,
   wherein the transmission parameter signaling bits comprise a network identifier for the second digital broadcast network, a cell identifier for the second cell, a transmission frequency for the second digital broadcast network, a guard interval for the second digital broadcast network, and a transmission mode for the second digital broadcast network.

6. The apparatus of claim 5 wherein the parameters of the second cell identify at least one of a number of neighboring networks, a number of neighboring signals in a current network, and a total number of neighboring frequencies.

7. The apparatus of claim 5, wherein the transmission parameter signaling bits for the first cell and the second cell include Digital Video Broadcast-Handheld signaling.

8. A non-transitory computer-readable medium comprising computer-readable instructions that, when executed, cause an apparatus to:

receive, from a transmitter in a first cell of a first digital broadcast network on a first frequency, a digital broadcast signal comprising digital multimedia content and a signaling frame, the signaling frame comprising transmission parameter signaling bits that provide parameters of the first cell of the first digital broadcast network and provide parameters of a second cell of a second digital broadcast network; and obtain the parameters of the second cell contained within the transmission parameter signaling bits, wherein the transmission parameter signaling bits comprise a network identifier for the second digital broadcast network, a cell identifier for the second cell, a transmission frequency for the second digital broadcast network, a guard interval for the second digital broadcast network, and a transmission mode for the second digital broadcast network.

9. The non-transitory computer-readable medium of claim 8, wherein the transmission parameter signaling bits for the first cell and the second cell include Digital Video Broadcast-Handheld signaling.

10. A method comprising:
receiving, by a device from a transmitter in a first cell of a first digital broadcast network on a first frequency, a digital broadcast signal comprising digital multimedia content and a signaling frame, the signaling frame comprising transmission parameter signaling bits that provide parameters of the first cell of the first digital broadcast network and provide parameters of a second cell of a second digital broadcast network; and obtaining the parameters of the second cell contained within the transmission parameter signaling bits, wherein the transmission parameter signaling bits comprise a network identifier for the second digital broadcast network, a cell identifier for the second cell, a transmission frequency for the second digital broadcast network, a guard interval for the second digital broadcast network, and a transmission mode for the second digital broadcast network.

11. The method of claim 10, wherein the parameters of the second cell identify at least one of a number of neighboring networks, a number of neighboring signals in a current network, and a total number of neighboring frequencies.

12. The method of claim 10, wherein the transmission parameter signaling bits for the first cell and the second cell include Digital Video Broadcast-Handheld signaling.

13. A method comprising:
receiving, by a device in a first cell within a first digital broadcasting network at a first frequency, a digital broadcast signal comprising digital multimedia content and a signaling frame, the signaling frame comprising transmission parameter signaling bits and a type field, wherein the transmission parameter signaling bits comprise a network identifier for a second digital broadcasting network, a cell identifier for a second cell of the second digital broadcasting network, a transmission frequency for the second digital broadcast network, a guard interval for the second digital broadcast network, and a transmission mode for the second digital broadcast network, wherein the signaling frame is received in signals transmitted from a transmitter in the first cell of the first digital broadcasting network;

comparing the type field to a first value and a second value; and at least one of:
determining that the signaling bits include parameters of the first cell within the first digital broadcasting network in response to the comparing indicating that the type field is the first value; or determining that the signaling bits include parameters of a first cell within the second digital broadcasting network different from the first digital broadcasting network in response to the comparing indicating that the type field is the second value.

14. The method of claim 13, wherein the comparing includes comparing the type field to a third value and the comparing indicates that the type field is the third value; and the method further comprising:

determining that the signaling bits include parameters of a second cell within the first digital broadcasting network in response to the comparing indicating that the type field is the third value.

15. The method of claim 14, further comprising:
receiving, subsequently in sequence with the signaling frame, one or more additional signaling frames each comprising a respective type field and respective transmission parameter signaling bits that include parameters of a respective cell within a respective network; and for each additional signaling frame:
determining that the parameters of the respective cell within the respective network of the additional signaling frame are associated with the first cell within the first digital broadcasting network in response to the respective type field being the first value, determining that the parameters of the respective cell within the respective network of the additional signaling frame are associated with a same cell as the respective cell within the respective network of a most recent previous additional signaling frame having a type parameter that is not the first value, in response to the type field of the additional signaling frame being the second value, or determining that the parameters of the respective cell within the respective network of the additional signaling frame are associated with a different cell from the first cell within the first network and associated with a different cell from the respective cell within the respective network of a most recent previous additional signaling frame having a type field that is not the first value, in response to the type field of the signaling frame being the third value.

16. The method of claim 13, wherein the first cell within the first network and the first cell within the second network are Digital Video Broadcast-Handheld network cells.

* * * * *